Patented Jan. 30, 1945

2,368,106

UNITED STATES PATENT OFFICE 2,368,106

LUBRICANT

Daniel E. Bergen, Phillips, Tex., assignor to Phillips Petroleum Company, a corporation of Delaware No Drawing. Original application December 19, 1940, Serial No. 370,903, now Patent No. 2,343,393, dated March 7, 1944. Divided and this application October 30, 1943, Serial No. 508,381

4 Claims. (Cl. 252—47)

This invention relates to lubricants and in particular, it relates to addition agents imparting to lubricants increased stability towards oxidation and sludge formation.

This application is a division of my copending application, Serial Number 370,903, filed December 19, 1940 and which has been issued as Patent No. 2,343,393 on Mar. 7, 1944.

My invention is particularly useful in retarding the formation of insoluble material usually called sludge, in lubricants. This solid and sludgy matter results from the action of atmospheric oxygen upon certain constituents of lubricants in the presence or in the absence of metals such as, for example, alloy bearings of the copper-lead, cadmium-nickel, or cadmium-silver types. Elevated temperatures such as those encountered in automotive crank cases accelerate this sludge formation. Many chemical compounds and materials have been proposed as addition agents which when added to lubricants may improve one or more of the properties thereof, for example, increase viscosity index of the oil, increase the oiliness or film strength, or decrease the corrosiveness thereof. Some of these addition agents while, for example, improving the oiliness or film strength of the oil, may have no effect on these other properties, or may even be deleterious as regards other characteristics.

An object of my invention is to provide a lubricant having reduced oxidation and sludge formation tendencies.

Another object of my invention is to provide a lubricant having generally improved qualities as well as reduced oxidation and sludge formation tendencies obtained by the addition of one or more agents or materials.

Still other objects and advantages will be apparent to those skilled in the art by a careful study of the following disclosure.

I have found that the addition of dithiocarbamate to lubricating oils causes a marked increase in the stability of the oils toward oxidation and sludge formation.

Most primary and secondary organic amines react with carbon disulfide to form dithiocarbamates having the general formula,

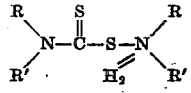

in which R and R' may be hydrogen and/or normal or iso-alkyl; alicyclic; aryl; aryl-alkyl groups; or nitrogen, sulfur or oxygen heterocyclic groups. The groups RR' may be a cycle containing the amino nitrogen atom in the ring, such as in the secondary amines resulting from the partial or complete reduction of nitrogen heterocyclics. R and R' may be alike or different. Any of these groups may contain substituted nitro, halogen, amino and/or hydroxy groups. Primary aromatic amines, such as aniline, are an exception in that they continue the reaction to form substituted thioureas in place of the carbamates. The use of the thioureas as additives to lubricating oils is known.

The addition of these dithiocarbamates to lubricating oils in concentrations from less than 0.005% to approximately 1% by weight, effects a marked increase in the stability of the oils toward oxidation and sludge formation. In addition, the viscosity index of the dithiocarbamate treated oils is somewhat increased, as well as the pour point being lowered. Other properties of the oils, such as lubricity, oiliness, and film strength may also be improved.

The following examples will illustrate the improvement in these properties by the addition of the dithiocarbamates, but I do not wish to limit my invention by the specific examples.

EXAMPLE I

Table I indicates the results of Indiana oxidation tests of an unstable oil containing 0.005 to 0.05% of certain dithiocarbamates as follows:

Table I

| Additive | Mg. sludge per 10 grams oil in 18 hours |
|---|---|
| Untreated oil | 37.7 |
| Piperidine dithiocarbamate | 12.3 |
| Pipecoline dithiocarbamate | 19.2 |
| Piperazine dithiocarbamate | 8.6 |
| Di-n-butyl thiol thiono carbamate | 14.5 |
| Bi-di-iso amyl thiol thiono carbamate | 10.5 |
| Tetra hydro quinoline dithio carbamate | 23.5 |

EXAMPLE II

The addition of 0.005% by weight of pipecoline methyl hexamethylene dithiocarbamate to a lubricating oil forming 10 milligrams of sludge per 10 grams of oil in 22 hours by Indiana oxidation extended the 10 milligram period to 28 hours.

EXAMPLE III

The viscosity index of the oil cited in Example II was increased from 94 to 97 by that additive. Similarly, the V. I. of this same oil was increased from 94 to 98.5 by the addition of 0.005% of dipiperazyl thiol thiono carbamate.

EXAMPLE IV

The pour point of a waxy oil was lowered from 40° to 25° F. by the addition of 0.005% of dipiperazyl thiol thiono carbamate.

In describing this aforementioned type of sulfur containing compounds, it might be mentioned that the term dithiocarbamate is synonymous with the grouping thiol thiono carbamate. The structural formula for carbamic acid

is well known, and is a derivative similar in structo the urea molecule, while thiocarbamic acid, namely $H_2N-CS-OH$ may be considered in a similar relation to thiourea. The second or remaining oxygen in this thiocarbamic acid molecule may be replaced by a sulfur atom yielding a dithiocarbamic acid, $H_2N-CS-SH$. This $=C=S$ group is known as the thiono group, while the $-S-H$ group is called the thiol group. Hence, a molecule containing both groups, as in the compounds disclosed, may be termed thiol thiono carbamates or dithiocarbamates and refer to the same molecule. For example, di-n-butyl thiol thiono carbamate is the same molecule as di-n-butyl dithiocarbamate; similarly di-di-isoamyl thiol thiono carbamate is synonymous with bi-di-isoamyl dithiocarbamate.

I do not wish to limit my invention to the specific examples given since many dithiocarbamate molecules prepared from the amines and containing the radicals given above serve within degree to improve the properties or characteristics of mineral lubricating oils and yet remain within the scope of my invention.

I claim:

1. An improved lubricating oil composition comprising a mineral lubricating oil having incorporated therein a small quantity of dipiperazyl thiol thiono carbamate sufficient to improve the viscosity index and pour point of the so treated oil.

2. An improved lubricating oil composition comprising a mineral lubricating oil having incorporated therein from 0.005% to 0.05% by weight of dipiperazyl thiol thiono carbamate to improve the properties of the so treated oil.

3. An improved lubricating oil composition comprising a mineral lubricating oil having incorporated therein from 0.005% to 0.05% by weight of dipiperazyl thiol thiono carbamate to increase the viscosity index of the so treated oil.

4. An improved lubricating oil composition comprising a mineral lubricating oil having incorporated therein from 0.005% to 0.05% by weight of dipiperazyl thiol thiono carbamate to lower the pour point of the so treated oil.

DANIEL E. BERGEN.